UNITED STATES PATENT OFFICE.

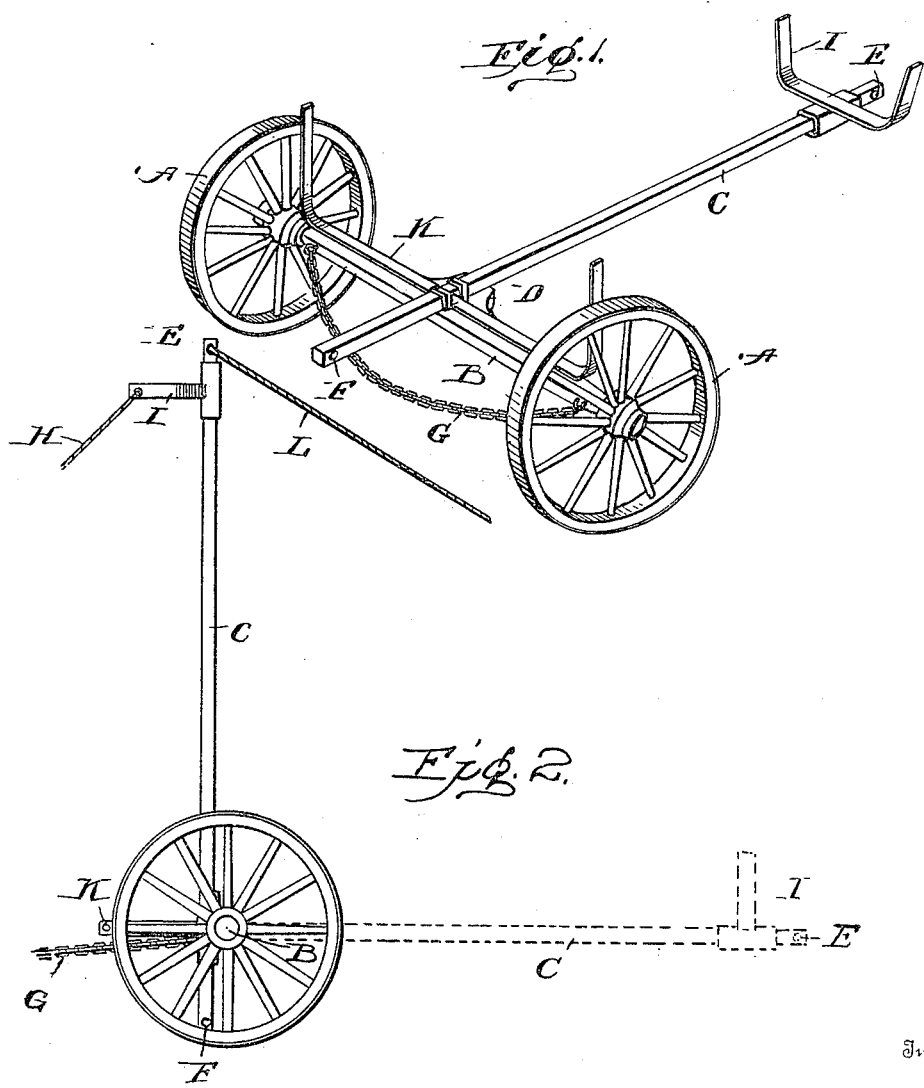

JOHN D. KAYLOR, OF HARRISON TOWNSHIP, LOGAN COUNTY, OHIO.

CORN-SHOCK LOADER AND CARRIER.

No. 812,272.     Specification of Letters Patent.     Patented Feb. 13, 1906.

Application filed January 6, 1905. Serial No. 239,950.

*To all whom it may concern:*

Be it known that I, JOHN D. KAYLOR, a citizen of the United States, residing in Harrison township, in the county of Logan and State of Ohio, have invented a new and useful Improvement in Corn-Shock Loaders and Carriers, of which the following is a specification.

My invention relates to certain improvements in a device for loading and hauling in shocks of corn to husking and shredding machines.

Figure 1 is a perspective view of my device; Fig. 2, a side view showing in dotted lines the position of the shock-carrier when loaded.

In the drawings, A A are the wheels of my cart; B, the axle, which also acts as a fulcrum; C, a pivoted lever that extends front some seven feet and to the rear far enough to extend nearly to the ground when vertical; E F, holes for coupling several carts together when loaded; G, rope or chain or wire attached at one end to the axle and detachable at the other end to pass around the back of the shock and secure it to the axle; H, similar chain attached to the ends of arms I I for further security. The arms I are mounted on the tongue so as to slide back and forth to accommodate them to shocks of different heights.

My device is intended to provide a simple, cheap, and expeditious way of handling shocks of corn and transporting them to the husker and shredder with as little breakage as possible. Under present conditions it requires a man on the wagon and two or three loaders on the ground to get the shocks from the field, about three to five shocks making a load. The shocks have to be torn apart, handed up onto the wagon by armfuls, where the man on the wagon again handles and tramps the fodder, during all of which operations it is more or less damaged, leaves and ears being knocked off. Besides this, the load becomes more or less tangled and difficult to feed to the machine. With my carts a boy can load a shock in much less time than three men can under present system and without tearing it apart. He simply backs the cart up against the shock, the wheels, which are some eight feet apart, straddling the shock. The lever C is raised vertically and leaned back against the top of the shock. This brings the shock inside the guards I and K. A chain, rope, or wire G, attached at one end to the axle, is then passed around back of the shock and hooked to the axle at the other side of the shock. A horse is hitched to rope L and lever C pulled down to a horizontal position, bringing the shock with it into the position shown in dotted lines in Fig. 2, breaking or uprooting the gallows as the shock comes over. After four or five of these carts are loaded they are coupled together by dropping a pin through hole E on one cart and hole F on another, when they are drawn to the machine, where they arrive in desired order for feeding, all the tops lying in the same direction.

What I claim is—

1. In a corn-shock loader and carrier, the wheels A, axle B, lever C, chain G, arms K and the arms I, adjustable on the lever to accommodate them to shocks of different length, as and for the purpose set forth.

2. In a corn-shock loader and carrier, the wheels A, axle B, lever C, chain G, arms K adjustable arms I and means for securing several carriers in train, as and for the purpose set forth.

JOHN D. KAYLOR.

Witnesses:
   C. D. CAMPBELL,
   EDWARD K. CAMPBELL.